United States Patent [19]
Sakai

[11] Patent Number: 5,247,691
[45] Date of Patent: Sep. 21, 1993

[54] SYSTEM FOR RELEASING SUSPENDED EXECUTION OF SCALAR INSTRUCTIONS FOLLOWING A WAIT INSTRUCTION IMMEDIATELY UPON CHANGE OF VECTOR POST PENDING SIGNAL

[75] Inventor: Kenichi Sakai, Yohohama, Japan
[73] Assignee: Fujitsu Limited, Kawasaki, Japan
[21] Appl. No.: 523,567
[22] Filed: May 15, 1990

[30] Foreign Application Priority Data

May 15, 1989 [JP] Japan .................................. 1-121277

[51] Int. Cl.⁵ .......................... G06F 9/312; G06F 9/38
[52] U.S. Cl. ...................... 395/800; 395/375; 364/931.51; 364/931.52; 364/DIG. 2; 364/232.21
[58] Field of Search ................................ 395/800, 375

[56] References Cited

U.S. PATENT DOCUMENTS

| | | | |
|---|---|---|---|
| 4,760,518 | 7/1988 | Potash et al. | 395/325 |
| 4,780,811 | 10/1988 | Aoyama et al. | 395/800 |
| 4,964,035 | 10/1990 | Aoyama et al. | 395/800 |
| 4,985,827 | 1/1991 | Hamanaka et al. | 395/375 |
| 4,991,083 | 2/1991 | Aoyama et al. | 395/800 |
| 5,060,148 | 10/1991 | Isobe et al. | 395/800 |

FOREIGN PATENT DOCUMENTS 61-86844 5/1986 Japan .
63-127368 5/1988 Japan .

*Primary Examiner*—Thomas C. Lee
*Assistant Examiner*—Paul Harrity
*Attorney, Agent, or Firm*—Staas & Halsey

[57] ABSTRACT

A data processing system containing a scalar unit, a vector unit, and a storage. The scalar unit receives scalar instructions and vector instructions, carries out scalar data processing in accordance with the scalar instructions, and transfers the vector instructions to the vector unit. The vector unit receives the vector instructions from the scalar unit, carries out vector data processing in accordance with the vector instructions, and contains a post pending signal generating circuit for generating a post pending signal. The Post Pending signal is made active when a post instruction is received from the scalar unit and is made inactive when a right to access the storage is obtained for reading or storing a last element read or stored by the vector instructions preceding the post instruction. The scalar unit further contains a wait instruction detecting circuit for detecting a transfer of a wait instruction to the vector unit, and an interlock control circuit for suspending executions of instructions which follow a wait instruction which is detected in the wait instruction detecting circuit and each including an operation to access the storage until the post pending signals changes from active to inactive.

10 Claims, 12 Drawing Sheets

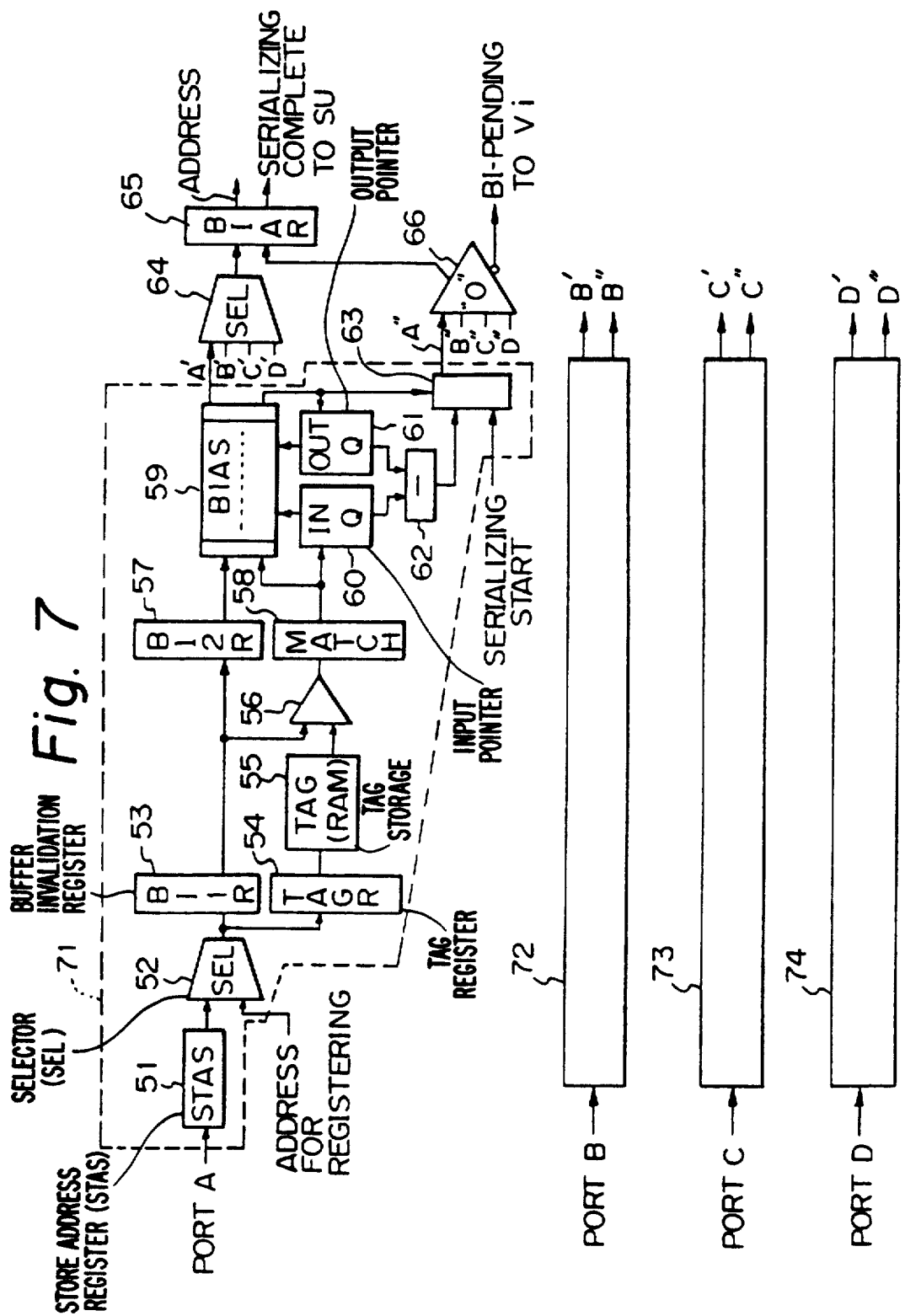

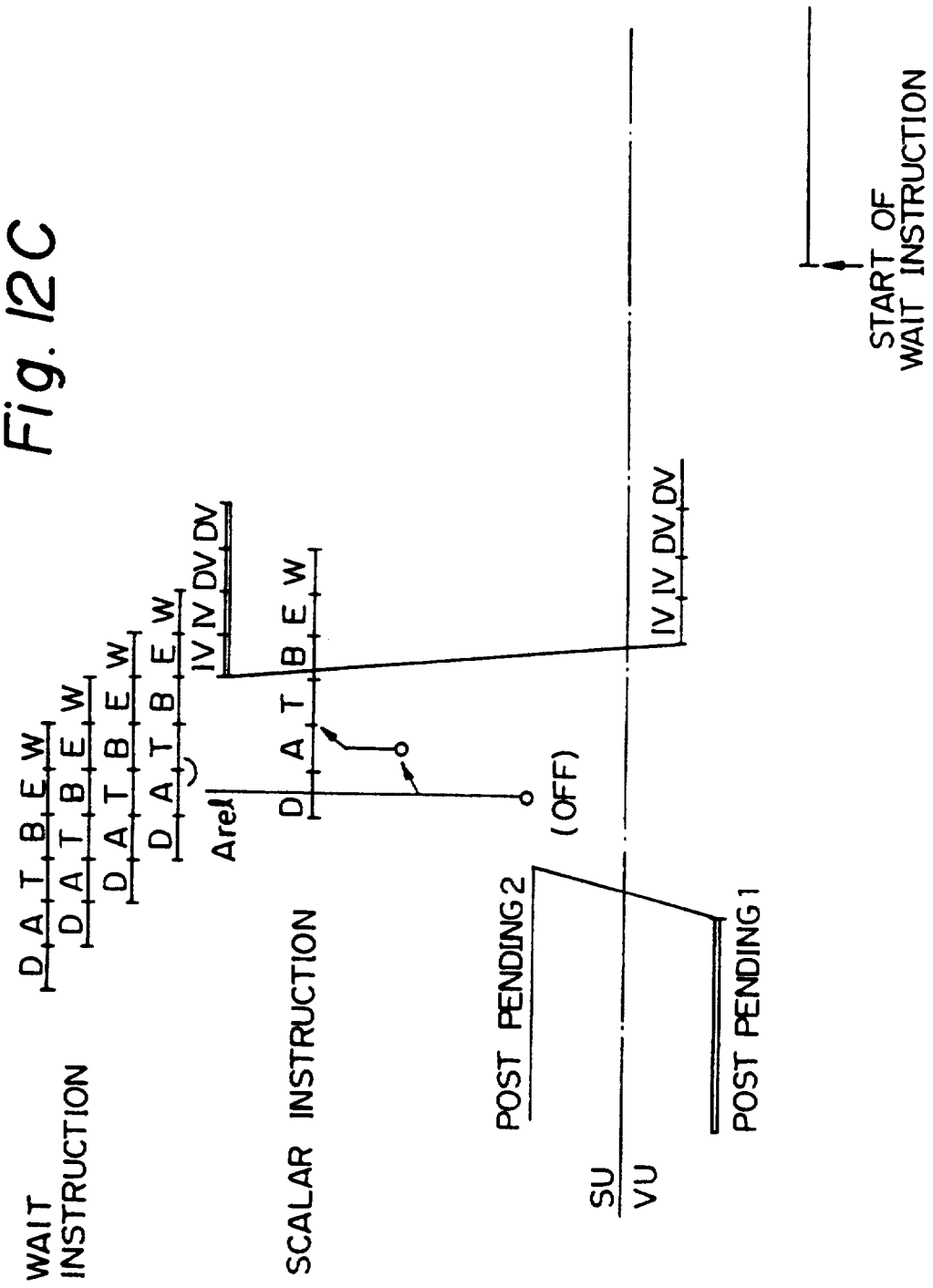

5,247,691

SYSTEM FOR RELEASING SUSPENDED EXECUTION OF SCALAR INSTRUCTIONS FOLLOWING A WAIT INSTRUCTION IMMEDIATELY UPON CHANGE OF VECTOR POST PENDING SIGNAL

BACKGROUND OF THE INVENTION

1. Field of the Invention

The present invention relates to a data processing system containing a scalar unit and a vector unit, wherein a serializing operation is performed, using a post instruction and wait instruction between one or more vector instructions and a scalar instruction.

In a data processing system containing a scalar unit and a vector unit wherein the scalar unit carries out scalar instructions and the vector unit carries out vector instructions, execution of a plurality of vector instructions and scalar instructions are carried out in parallel, and prefetching of instructions and data is carried out. In the above data processing system, the order of operations to access the storage must be ensured between vector instructions and between a vector instruction and a scalar instruction, although the order of operations to access the storage is ensured by nature between scalar instructions in the scalar unit. The serializing operation is carried out to ensure the order of the operations to access the storage between vector instructions and between a vector instruction and a scalar instruction.

2. Description of the Related Art

FIG. 1 shows a data processing system containing a scalar unit and a vector unit. In FIG. 1, the scalar unit 1' fetches instructions in a program in order, executes the fetched instruction when the instruction is a scalar instruction, or sends the fetched instruction to the vector unit 2' when the instruction is a vector instruction to make the vector unit execute the instruction. In the vector unit 2', the vector instruction control circuit 12' in the vector control unit 11 receives the vector instruction which is transferred from the scalar unit 1', and controls the execution of the vector instruction. When the vector instruction is a load instruction or a store instruction, the execution of the instruction is controlled in the vector load/store control circuit 13, and an operation to access the main storage 10 is carried out through the memory control unit 14'. A load operation of vector data which is read from the main storage 10 in the vector register 7 or a store operation of vector data which is read from the vector register 7 in the main storage 10 is carried out in the load/store pipeline 8 or 9 under the control of the vector load/store control circuit 13. An operation to access the main storage 10 from the scalar unit 1' is also carried out through the main storage unit 14'.

It is desired that the scalar unit and the vector unit operate in parallel as long as it is possible. However, when data which is fetched for an execution of a vector instruction or a scalar instruction is obtained by an execution of a preceding vector instruction or a scalar instruction, the order of operations to access the main storage 10 must be ensured between the preceding instruction and the following instruction. Since requests for accessing the main storage can arise in parallel in the scalar unit and the plurality of load/store pipelines, the above ensuring of the order must be performed between a preceding vector load instruction and a following vector instruction, between a preceding vector store instruction and a following vector instruction, between a preceding scalar store instruction and a following vector instruction, between a preceding vector load instruction and a following scalar instruction, and between a preceding vector store instruction and a following scalar instruction. The order of operations to access the main storage between a preceding scalar load instruction and a following vector instruction is ensured by nature. The order of operations to access the storage is ensured by nature between scalar instructions in the scalar unit because the scalar unit contains one pipeline.

Generally, the order of operations to access the main storage between a preceding vector load instruction and a following vector instruction, between a preceding vector store instruction and a following vector instruction, between a preceding scalar store instruction and a following vector instruction, and between a preceding vector load instruction and a following scalar instruction, are respectively ensured simply regarding the order of obtaining a right of access to the main storage.

On the other hand, the order of operations to access the main storage between a preceding vector store instruction and a following scalar instruction, is ensured considering the following situation. The scalar unit usually contains a buffer memory (cache) for temporarily storing portions (blocks) of data of the main storage to which portions (blocks) the scalar unit has recently accessed. When the address of the main storage to which address a result of an execution of a vector store instruction is stored, corresponds to one of the blocks of data which is temporarily stored in the buffer memory, the corresponding block of data in the buffer memory must be invalidated before data fetch operations for following scalar instructions are carried out to the buffer memory. Therefore, an execution of a scalar instruction which includes a data fetch operation, must be stopped until the above invalidation of the buffer memory is completed.

To ensure the above order, conventionally, a serializing operation using a post instruction and a wait instruction is carried out. In the serializing operation, control is performed so that an operation for accessing the main storage for an instruction preceding the post instruction, is carried out before an operation for accessing the main storage for an instruction following the wait instruction. In this operation, no control is performed for the instructions between the post instruction and the wait instruction, regarding the order of operations to access the main storage.

FIG. 2 shows an example of a sequence of instructions which includes a post instruction and a wait instruction for carrying out a serializing operation. In FIG. 2, VSTi (i=1 to 8) each denote a vector store instruction, POST denotes a post instruction, WAIT denotes a wait instruction, and LD denotes a scalar load instruction. The execution of the scalar load instruction LD which follows the wait instruction, is suspended until a right to access the main storage for the execution of the vector store instruction VST1 which precedes the post instruction POST is obtained.

FIG. 3 shows a conventional flow of executions of the vector store instructions VST1 to VST8 of FIG. 2. Two vector store instructions are executed simultaneously in parallel in the two load/store pipelines 8 and 9 of FIG. 1. In FIG. 3, the parallelogram for each vector store instruction indicates a plurality of processing flows which are processed in a load/store pipeline. In the conventional serializing operation, an active post pending signal POST-PENDING which indicates whether or not the executions of the vector instructions preceding a post instruction is completed yet, is output from the vector unit to the scalar unit, the post pending signal POST-PENDING is made active when the execution of the post pending signal POST-PENDING is started in the vector unit, and is made inactive when the executions for all vector instructions preceding the post instruction are completed. In addition, when an execution of a wait instruction is started in the vector unit, a wait acknowledge signal WAIT-ACK is output from the vector unit to the scalar unit. In the scalar unit, when a wait instruction is detected, execution of scalar instructions following the wait instruction is first stopped, and the scalar unit awaits the above wait acknowledge signal WAIT-ACK. Then, when the scalar unit receives the wait acknowledge signal WAIT-ACK, the scalar unit determines whether or not the executions for all vector instructions preceding the post instruction are completed, based on the received post pending signal POST-PENDING. When the post pending signal POST-PENDING is inactive, the scalar unit releases the execution of the scalar instructions following the wait instruction, e.g., a scalar load instruction LD shown in FIG. 2 can be executed. Namely, conventionally the judgment for the release of scalar instructions following a wait instruction can be made after the wait instruction is started in the vector unit.

However, in the above conventional serializing operation, there is a delay between the time of the change of the post pending signal POST-PENDING to inactive, and the output time of the wait acknowledge, as shown in FIG. 3, i.e., the scalar unit cannot immediately detect the change of the post pending signal POST-PENDING from active to inactive. Therefore, in the prior art, the start of the execution of the scalar instructions following the wait instruction, and accordingly execution of all the instructions following the wait instruction, is delayed according to the above delay between the time of the change of the post pending signal POST-PENDING to inactive, and the output time of the wait acknowledge. The reason why the above judgment for the release of scalar instructions following a wait instruction is made at the timing of the reception of the wait acknowledge signal, is that, conventionally, the scalar unit cannot recognize when a post instruction preceding the wait instruction is started in the vector unit, i.e., when the post pending signal POST-PENDING becomes active.

SUMMARY OF THE INVENTION

An object of the present invention is to provide a data processing system wherein a starting time of an execution of a scalar instruction which follows a wait instruction is advanced in a serializing operation between a preceding vector instruction and a following scalar instruction using a post instruction and a wait instruction, and the total execution time of successive instructions including a post instruction and a wait instruction for the serializing operation is reduced.

According to the first aspect of the present invention, there is provided a data processing system, comprising a scalar unit, a vector unit, and a storage. The scalar unit receives scalar instructions and vector instructions, carries out scalar data processing in accordance with the scalar instruction, and transfers the vector instruction to the vector unit. The vector unit receives the vector instruction from the scalar unit, carries out vector data processing in accordance with the vector instruction, and comprises a post pending signal generating circuit for generating a post pending signal which is made active when a post instruction is received in the vector unit, and is made inactive when a right to access the storage is obtained for reading or storing a last element read or stored by the instructions preceding the post instruction. The scalar unit further comprises a wait instruction detecting circuit for detecting a transfer of a wait instruction to the vector unit, and an interlock control circuit for suspending executions of instructions which follow a wait instruction which is detected in the wait instruction detecting circuit and each including an operation to attempt to access the storage until the post pending signals changes from active to inactive.

In the second aspect of the present invention, the scalar unit activates its own post pending signal based on the post pending signal in the vector unit. There is provided a data processing system, comprising a scalar unit, a vector unit, and a storage. The scalar unit receives scalar instructions and vector instructions, carries out scalar data processing in accordance with the scalar instruction, and transfers the vector instruction to the vector unit. The vector unit receives the vector instruction from the scalar unit, carries out vector data processing in accordance with the vector instruction, and comprises a first post pending signal generating circuit for generating a first post pending signal which is made active when a post instruction is received from the scalar unit and is made inactive when a right to access the storage is obtained for reading or storing a last element read or stored by the vector instructions preceding the post instruction. The scalar unit further comprises a post instruction detecting circuit for detecting a transfer of a post instruction to the vector unit, a wait instruction detecting circuit for detecting a transfer of a wait instruction to the vector unit, a second post pending signal generating circuit which receives the output of the post instruction detecting circuit and the first post pending signal, and generates a second post pending signal which is made active when a post instruction is transferred to the vector unit and is made inactive when the first post pending signal becomes inactive, and an interlock control circuit for suspending executions of instructions which follow the wait instruction which is detected in the wait instruction, detecting circuit and each including an operation to attempt to access the storage, while the second post pending signal is active.

In the third aspect of the present invention, a memory control unit grants the right to access the storage to either the scalar unit or vector unit by outputting a memory access acknowledge signal. There is provided a data processing system, comprising a scalar unit, a vector unit, a storage, and a memory control unit. The scalar unit receives both a scalar instruction and a vector instruction, carries out scalar data processing in accordance with the scalar instruction, transfers the vector instruction to the vector unit, and sends requests for accessing the storage to the memory control unit during the scalar data processing in accordance with the scalar instruction. The vector unit receives the vector instruction from the scalar unit, carries out vector data processing in accordance with the vector instruction, and sends requests for accessing the storage to the memory control unit during the vector data processing in accordance with the vector instruction. The memory control unit receives the requests for accessing the storage from the scalar unit and the vector unit, carries out operations to access the storage for the received requests, and comprises a priority control circuit for outputting an active memory access acknowledge signal responding to one of the received requests for giving a right to access the main storage to a corresponding one of the scalar unit and a vector unit. The vector unit further comprises a first post pending signal generating circuit for generating a first post pending signal which is made active when a post instruction is received from the scalar unit and is made inactive when a right to access the storage is obtained for reading or storing a last element read or stored by the vector instructions preceding the post instruction. The scalar unit further comprises, a post instruction detecting circuit for detecting a transfer of a post instruction to the vector unit, a wait instruction detecting circuit for detecting a transfer of a wait instruction to the vector unit, a second post pending signal generating circuit which receives the output of the post instruction detecting circuit and the first post pending signal, and generates a second post pending signal which is made active when a post instruction is transferred to the vector unit and is made inactive when the first post pending signal becomes inactive, and an interlock control circuit for suspending executions of instructions which follow the wait instruction which is detected in the wait instruction detecting circuit and each including an operation to access the storage, while the second post pending signal is active.

In the fourth aspect of the present invention, the scalar unit has a buffer memory of data accessed in main storage, and this data is invalidated when the address corresponds to an address accessed by a vector operation. The post pending signal does not become inactive until the invalidation process is complete. There is provided a data processing system, comprising a scalar unit, a vector unit, a storage, and a memory control unit. The scalar unit receives both a scalar instruction and a vector instruction, carries out scalar data processing in accordance with the scalar instruction, transfers the vector instruction to the vector unit, and requests the memory control unit to access the storage during the scalar data processing in accordance with the scalar instruction. The vector unit receives the vector instruction from. The scalar unit, carries out vector data processing in accordance with the vector instruction, and sends requests for accessing the storage to the memory control unit during the vector data processing in accordance with the vector instruction. The memory control unit receives the requests for accessing the storage from the scalar unit and the vector unit, carries out operations to access the storage for the received requests, and comprises, a buffer memory invalidation address storing circuit for temporarily storing one or more addresses to which addresses in the storage access operations are carried out, a buffer memory invalidation address transferring circuit for transferring the addresses stored in the buffer memory invalidation address storing circuit to the scalar unit, and removing the transferred addresses from the buffer memory invalidation address storing circuit, a transfer complete signal generating circuit for generating a transfer complete signal which indicates that all addresses stored in the buffer memory invalidation address storing circuit have been transferred to the scalar unit when active, and a priority control circuit for outputting an active memory access acknowledge signal responding to one of the received requests for giving a right to access the main storage to a corresponding one of the scalar unit and a vector unit. The vector unit further comprises, an after start stages control circuit for controlling an execution of a vector instruction after its start, including operations to access the storage for a vector instruction, and comprising a last memory access detecting circuit for detecting that a right to access the storage is obtained for reading or storing a last element through the execution of the vector instruction, and outputting a last memory access signal which indicates the detection, and a first post pending signal generating circuit for generating a first post pending signal which is made active when a post instruction is received from the scalar unit, and is made inactive when an active transfer complete signal is received from the memory control unit and an active last memory access signal from the last memory access detecting circuit. The scalar unit further comprises a buffer memory for temporarily storing a portion of data of the main storage, a buffer memory invalidation circuit for invalidating data in the buffer memory using the addresses which are transferred by the buffer memory invalidation address transferring circuit when the address of the data in the buffer memory corresponds to the address in the storage to which a write operation from the vector unit has been carried out, a post instruction detecting circuit for detecting a transfer of a post instruction to the vector unit, a wait instruction detecting circuit for detecting a transfer of a wait instruction to the vector unit, a second post pending signal generating circuit which receives the output of the post instruction detecting circuit and the first post pending signal and generates a second post pending signal which is made active when a post instruction is transferred to the vector unit and is made inactive when the first post pending signal becomes inactive, and an interlock control circuit for suspending execution of instructions which follow the wait instruction which is detected in the wait instruction detecting circuit and each including an operation to access the storage, while the second post pending signal is active.

BRIEF DESCRIPTION OF THE DRAWINGS

In the drawings:

FIG. 7 shows a construction of the memory control unit 14 relating the buffer invalidation;

FIGS. 12A, 12B, and 12C show an example of the operations of the embodiment of the present invention.

DESCRIPTION OF THE PREFERRED EMBODIMENTS

Figure 1:
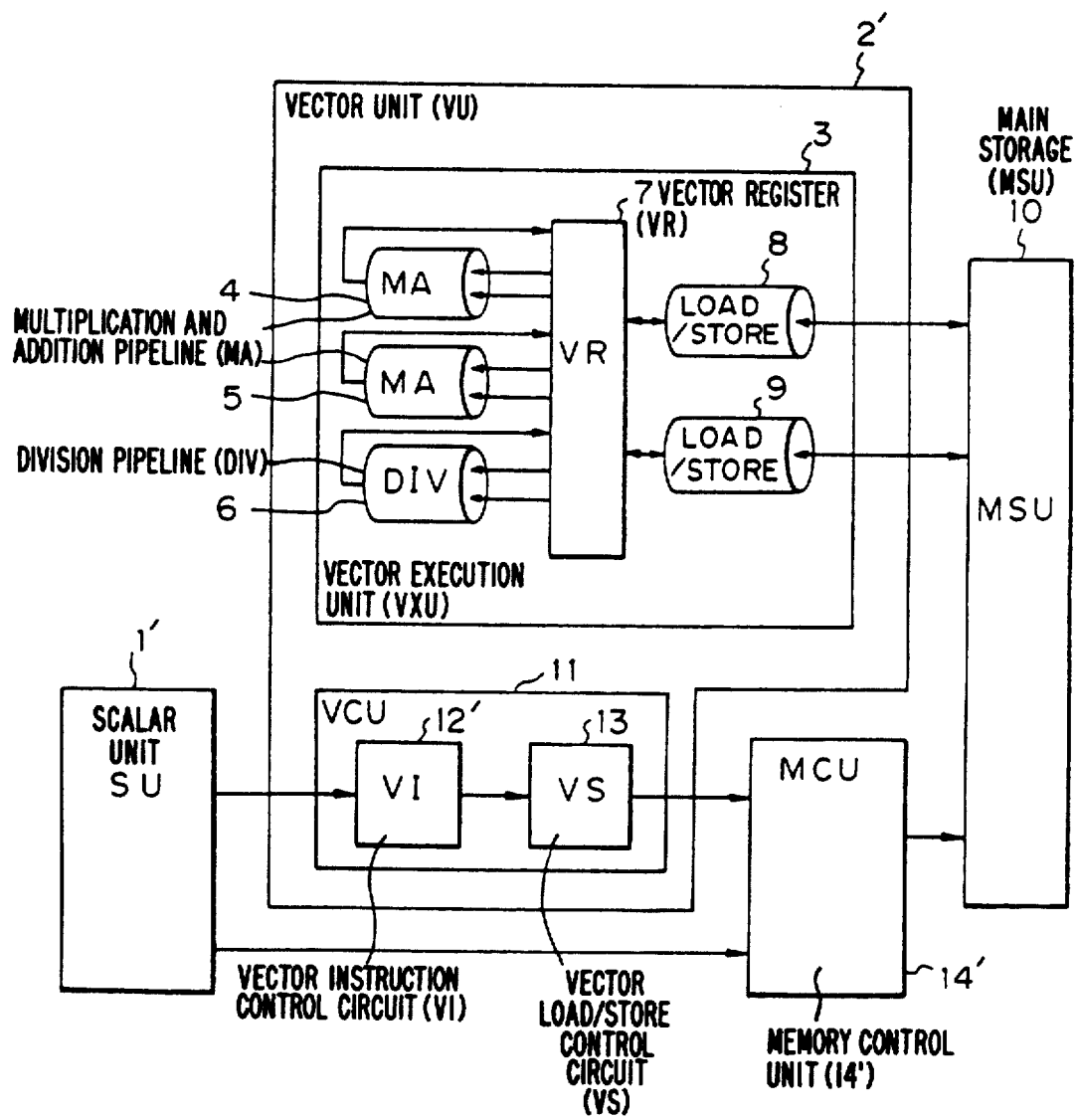
FIG. 1 shows a data processing system containing a scalar unit and a vector unit.
Figure 2:
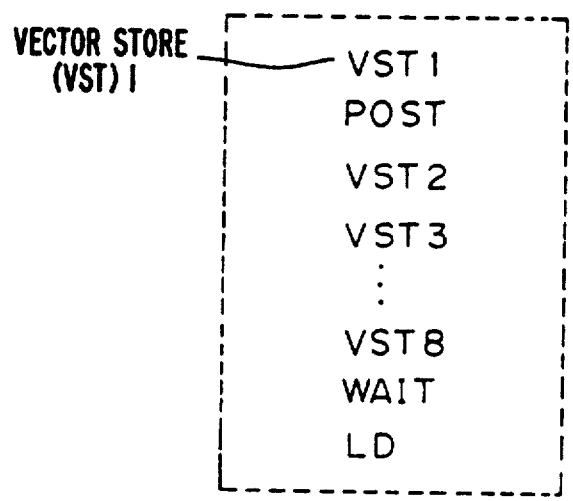
FIG. 2 shows an example of sequence of instructions which includes a post instruction and a wait instruction for carrying out a serializing operation.
Figure 3:
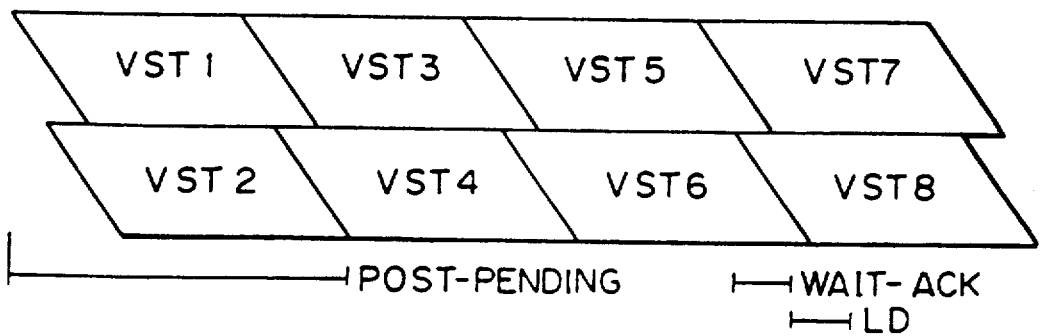
FIG. 3 shows a conventional flow of executions of the vector store instructions VST1 to VST8 of FIG. 2.

(1) Basic Operations of Various Aspects of the Present Invention

Before describing the preferred embodiment of the present invention, first, the basic operations of the various aspects of the present invention are explained below.

According to the first aspect of the present invention, when a post instruction is transferred from the scalar unit to the vector unit, the post pending signal which is generated in the post pending signal generating circuit in the vector unit, is made active responding to a reception of a post instruction. After that, when the scalar unit detects a wait instruction by the wait instruction detecting circuit, the interlock control circuit in the scalar unit suspends executions of instructions which follow the wait instruction and each including an operation to access the storage, until the post pending signal changes from active to inactive. The post pending signal is made inactive when a right to is obtained for reading or storing a last element read or stored by the vector instructions preceding the post instruction, and receiving the inactive post pending signal, the interlock control circuit in the scalar unit releases the executions of the above instructions which follow the wait instruction in the scalar unit. Thus, the executions of the above instructions which follow the wait instruction and each including an operation to access the storage, can be started as soon as the right to access the storage is obtained for reading or storing a last element read or stored by the vector instructions preceding the post instruction. The early start of the execution of the instructions following the wait instruction in the scalar unit in parallel with the execution of the vector instructions following the post instruction in the vector unit, reduces the total processing time for the successive instructions including a post instruction and a wait instruction.

In the second aspect of the present invention, when a post instruction is given to the scalar unit, the transfer of the post instruction to the vector unit is detected by the post instruction detecting circuit in the scalar unit. Responding to this detection, the second post pending signal generated in the second post pending signal generating circuit in the scalar unit, is made active. Receiving the post instruction, the first post pending signal which is generated in the first post pending signal generating circuit in the vector unit, is made active. After that, when the scalar unit detects a wait instruction by the wait instruction detecting circuit, the interlock control circuit in the scalar unit suspends executions of instructions which follow the wait instruction and each including an operation to access the storage, until the second post pending signal changes from active to inactive. The first post pending signal is made inactive when a right to access the storage is obtained for reading or storing a last element read or stored by the vector instructions preceding the post instruction, and receiving the inactive first post pending signal from the vector unit, the second post pending signal becomes inactive. Responding to the inactive second post pending signal, the interlock control circuit in the scalar unit releases the executions of the above instructions which follow the wait instruction and each including an operation to access the storage. Similar to the first aspect of the present invention, the execution of the above instructions which follow the wait instruction and each including an operation to access the storage, can be started as soon as the right to access the storage is obtained for reading or storing a last element through operations for all vector instructions preceding the post instruction.

In the third aspect of the present invention, when a post instruction is given to the scalar unit, the transfer of the post instruction to the vector unit is detected by the post instruction detecting circuit in the scalar unit. Responding to this detection, the second post pending signal generated in the second post pending signal generating circuit in the scalar unit, is made active. Receiving the post instruction, the first post pending signal which is generated in the first post pending signal generating circuit in the vector unit, is made active. After that, when the scalar unit detects a wait instruction by the wait instruction detecting circuit, the interlock control circuit in the scalar unit suspends execution of instructions which follow the wait instruction each including an operation to access the storage, until the second post pending signal changes from active to inactive. When a right to access the storage is obtained for reading or storing a last element read or stored by the vector instructions preceding the post instruction, which is recognized by the vector unit using the memory access acknowledge signal from the memory control unit, the first post pending signal is made inactive in the vector unit responding to the active memory access acknowledge signal. Receiving the inactive first post pending signal from the vector unit, the second post pending signal becomes inactive. Responding to the inactive second post pending signal, the interlock control circuit in the scalar unit releases the execution of the above instructions which follow the wait instruction each including an operation to access the storage. Thus, similar to the above first and second aspects of the present invention, the execution of the above instructions which follow the wait instruction each including an operation to access the storage, can be started as soon as the right to access the storage is obtained for reading or storing a last element read or stored by the vector instructions preceding the post instruction.

The fourth aspect of the present invention covers the data processing system wherein the scalar unit contains a buffer memory. When a post instruction is given to the scalar unit, the transfer of the post instruction to the vector unit is detected by the post instruction detecting circuit in the scalar unit. Responding to this detection, the second post pending signal generated in the second post pending signal generating circuit in the scalar unit, is made active. Receiving the post instruction, the first post pending signal which is generated in the first post pending signal generating circuit in the vector unit, is made active. After that, when the scalar unit detects a wait instruction by the wait instruction detecting circuit, the interlock control circuit in the scalar unit suspends execution of instructions which follow the wait instruction each including an operation to access the storage, until the second post pending signal changes from active to inactive. When a right to access the storage is obtained for reading or storing a last element read or stored by the vector instructions preceding the post instruction, the obtaining of the right is detected by the last memory access detecting circuit in the vector unit using the memory access acknowledge signal from the memory control unit, and an active last memory access signal is output from the last memory access detecting circuit.

When a store operation is carried out by the vector unit in accordance with instructions preceding the post instruction, the address in the storage to which the store operation from the vector unit has been carried out, is stored in the buffer memory invalidation address storing circuit, and the address is transferred to the scalar unit by a buffer memory invalidation address transferring circuit. The buffer memory invalidation circuit in the scalar unit invalidates data in the buffer memory using the addresses which are transferred by the buffer memory invalidation address transferring circuit, when the address of the data in the buffer memory corresponds to the address in the storage to which the write operation from the vector unit has been carried out. When all addresses stored in the buffer memory invalidation address storing circuit have been transferred to the scalar unit, the transfer complete signal generating circuit generates an active transfer complete signal. When both the last memory access signal and the transfer complete signal become active, the first post pending signal from the first post pending signal generation circuit becomes inactive.

Receiving the inactive first post pending signal from the vector unit, the second post pending signal becomes inactive. Responding to the inactive second post pending signal, the interlock control circuit in the scalar unit releases the execution of the above instructions which follow the wait instruction and each including an operation to access the storage. Thus, similar to the above first, second, and third aspects of the present invention, the execution of the above instructions which follow the wait instruction and each including an operation to access the storage, can be started as soon as the right to access the storage is obtained for reading or storing a last element read or stored by the vector instructions preceding the post instruction.

(2) Details of the Preferred Embodiment

Figure 4:
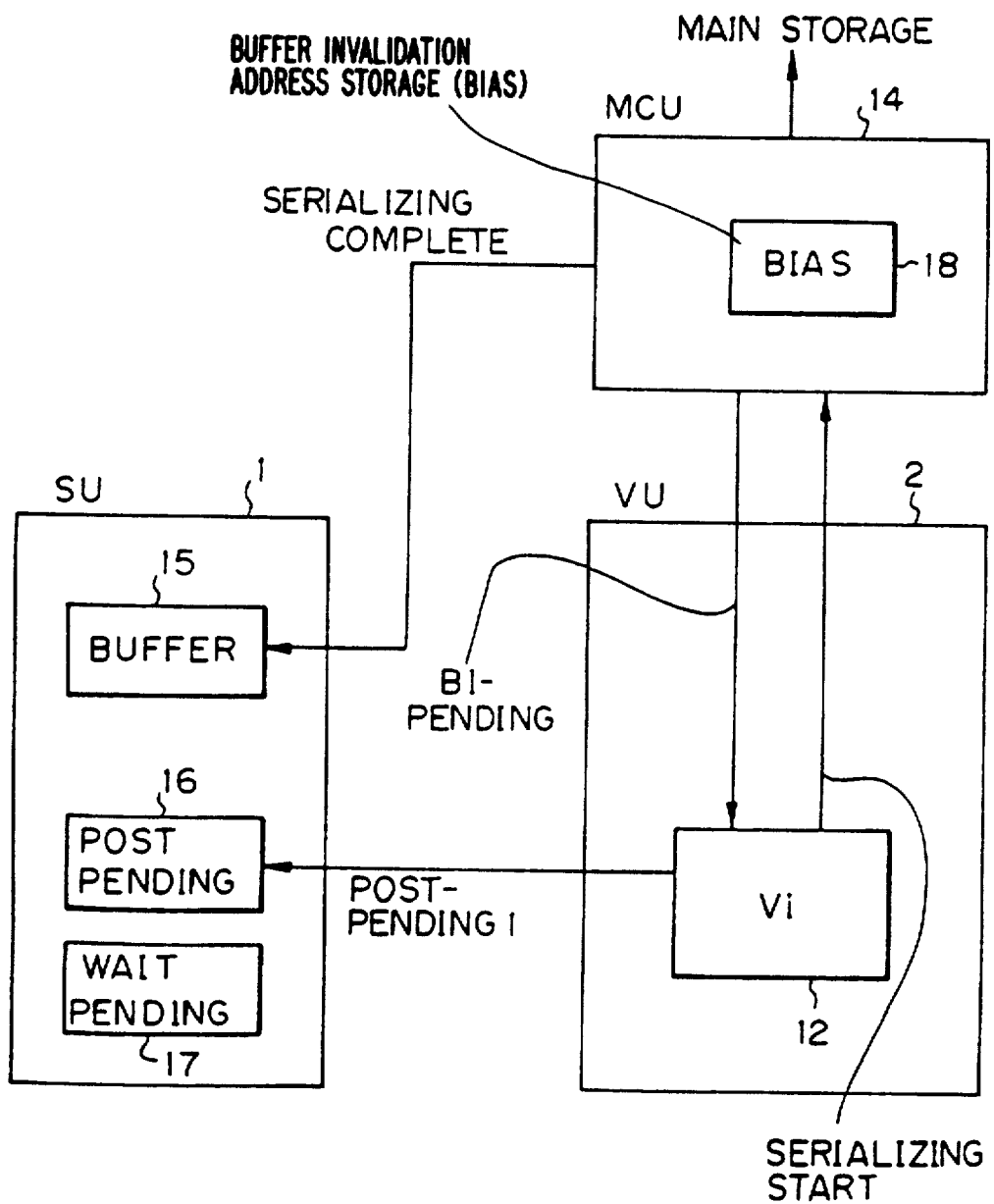
FIG. 4 shows an outline of the construction of the embodiment of the present invention.

FIG. 4 shows an outline of the construction of the embodiment of the present invention.

In FIG. 4, reference numeral 1 denotes a scalar unit, 2 denotes a vector unit, 14 denotes a memory control unit, 12 denotes a vector instruction control circuit, 15 denotes a buffer memory, 16 denotes a post pending signal latch circuit, 17 denotes a wait pending signal latch circuit, and 18 denotes a buffer invalidation address storage.

The scalar unit 1, the vector unit 2, the memory control unit 14, and the vector instruction control circuit 12 in the vector unit 2 respectively function basically the same as the corresponding components of FIG. 1, except as explained below.

The buffer memory 15 in the scalar unit 1 temporarily stores portions (blocks) of data of the main storage to which portions (blocks) the scalar unit has recently accessed.

The buffer invalidation address storage 18 in the memory control unit 14 temporarily stores addresses in which addresses in the main storage in which the vector unit 2 has stored data in accordance with vector store instructions, when the addresses correspond to the portions of data stored in the buffer memory 15 in the scalar unit 1, until the stored addresses are transferred to the scalar unit 1 to invalidate the corresponding portions of data in the buffer memory 15.

The SERIALIZING START signal is output from. The vector instruction control circuit 12 to the buffer invalidation address storage 18, at the timing when the addresses which should be stored in the buffer invalidation address storage 18 for all the vector store instructions preceding a post instruction, have actually been stored in the buffer invalidation address storage 18.

A BI-PENDING signal is output from the memory control unit 14 to the vector instruction control circuit 12, and is active from the time the memory control unit 14 receives the SERIALIZING START signal until all the the contents of the buffer invalidation address storage 18 has been transferred to the scalar unit 1. The inversion of the BI-PENDING signal corresponds to the aforementioned transfer complete signal in the fourth aspect of the present invention as explained later.

The POST-PENDING1 signal, which is output from the vector instruction control circuit 12 to the scalar unit 1, is made active when the vector unit 2 receives a post instruction from the scalar unit 1, and is made inactive when the addresses which should be stored in the buffer invalidation address storage 18 for all the vector store instructions preceding a post instruction, have actually been stored in the buffer invalidation address storage 18, and the right to access the storage is obtained for reading or storing a last element read or stored by the vector instructions preceding the post instruction. The POST-PENDING1 signal corresponds to the aforementioned post pending signal POST-PENDING in the first aspect of the present invention, and the aforementioned first post pending signal in the second to fourth aspects of the present invention.

The SERIALIZING COMPLETE signal is output from the memory control unit 14 to the scalar unit 1 when the addresses which have been stored in the buffer invalidation address storage 18 for all the vector store instructions preceding a post instruction, have actually been transferred from the buffer invalidation address storage 18 to the scalar unit 1 after the SERIALIZING START signal has been output from the vector instruction control circuit 12 to the buffer invalidation address storage 18. Receiving the SERIALIZING COMPLETE signal, the scalar unit 1 suspends the execution of the scalar instructions which follow the wait instruction and which each include an access operation to the main storage, and carries out an invalidation of the corresponding addresses (blocks) of data in the buffer memory 15.

Figure 5:
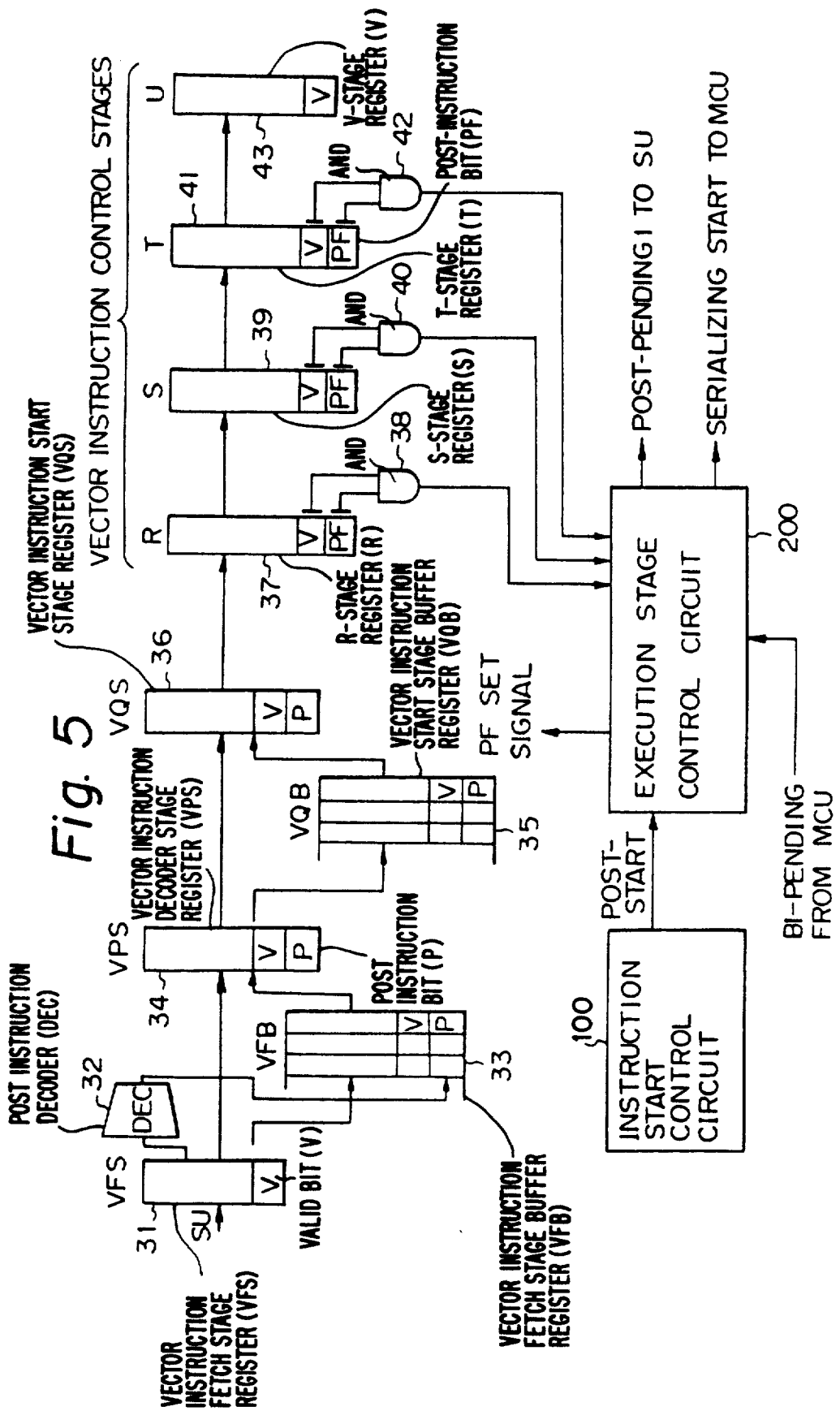
FIG. 5 shows the construction of the vector unit 2 relating to the present invention.

FIG. 5 shows the construction of the vector unit 2 relating to the present invention. In FIG. 5, 31 denotes a vector instruction fetch stage register, 32 denotes a post instruction decoder, 33 denotes a vector instruction fetch stage buffer register, 34 denotes a vector instruction decode stage register, 35 denotes a vector instruction start stage buffer register, 36 denotes a vector instruction start stage register, 37 denotes an R-stage register, 38, 40, and 42 each denote an AND circuit, 39 denotes an S-stage register, 41 denotes a T-stage register, 43 denotes a U-stage register, 100 denotes an instruction start control circuit, and 200 denotes an execution stage control circuit.

The vector instructions transferred from the scalar unit 1 are held in the vector instruction fetch stage register 31, the vector instruction decode stage register 34, and the vector instruction start stage register 36, respectively, in the corresponding stages. The vector instruction fetch stage buffer register 33 is provided between the vector instruction fetch stage register 31 and the vector instruction decode stage register 34, and the vector instruction start stage buffer register 35 is provided between the vector instruction decode stage register 34 and the vector instruction start stage register 36. In addition, the output of the vector instruction decode stage register 34 is decoded in the vector instruction decode stage, and a post instruction is detected by the post instruction decoder 32. The output of the post instruction decoder 32 is attached to corresponding instruction data including a first post instruction bit "P", and is transferred together with the corresponding instruction data from the vector instruction start stage buffer register 33 through the vector instruction start stage register 36. The other bit which is denoted by "V" is a valid bit which indicates whether or not the corresponding stage is valid. The instruction start control circuit 100 controls the above operations through the vector instruction fetch stage, the vector instruction decode stage, and the vector instruction start stage.

The R-stage, S-stage, T-stage, and U-stage are execution control stages of vector instructions, and the execution of each vector instruction in the load/store pipeline is controlled in the above stages. In the R. stage (read stage), a data reading operation from the vector register or the main storage is carried out. In the S-stage (start-up stage), the operation from the start of the execution until the store or load operation of the first element is controlled. In the T-stage (terminate stage), the operation after the S-stage until the store or load operation of the last element (obtaining of a right to access the main storage for reading or storing a last element through operations for each vector instruction) is controlled. In the U-stage, exception processing is controlled.

Each of the R-stage, S-stage, and T-stage registers 37, 39, and 41 contains a valid bit "V" and a second post instruction bit "PF", where the valid bit indicates whether or not the corresponding stage is valid. The second post instruction bits "PF" in the R-stage, S-stage, and T-stage registers 37, 39, and 41 are made active by the execution stage control circuit 200 when a post instruction is started. The execution stage control circuit 200 carries out the setting of the second post instruction bits "PF" responding to a POST-START signal which is supplied from the instruction start control circuit when a post instruction is started. Each second post instruction bit "PF" is transferred with the corresponding instruction data through the R-stage, S-stage, and T-stage registers 37, 39, and 41. Namely, when the operation of the vector instruction in the R-stage having an active second post instruction bit "PF" is completed, the operation of the vector instruction is shifted to the S-stage, and the instruction data in the R-stage register 37 is transferred to the S-stage register 39 together with the active second post instruction bit "PF". Similarly, when the operation of the vector instruction in the S. stage having an active second post instruction bit "PF" is completed, the operation of the vector instruction is shifted to the T-stage, and the instruction data in the S-stage register 39 is transferred to the T-stage register 41 together with the active second post instruction bit "PF". Further, when the operation of the vector instruction in the T-stage having an active second post instruction bit "PF" is completed, the operation of the vector instruction is shifted to the U-stage, the instruction data in the T-stage register 41 is transferred to the U-stage register 43, and the active second post instruction bit "PF" disappears.

Figure 6:
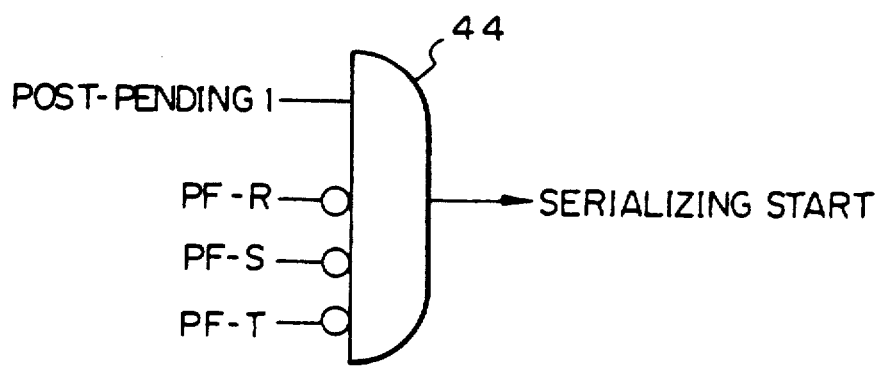
FIG. 6 shows a construction to generate the SERIALIZING START signal in the execution stage control circuit 200.

The valid bit "V" and the second post instruction bit "PF" in the R-stage register 37 are input into the AND circuit 38, the valid bit v and the second post instruction bit "PF" in the S-stage register 39 are input into the AND circuit 40, and the valid bit "V" and the second post instruction bit "PF" in the T-stage register 41 are input into the AND circuit 42. When the right to access the main storage is obtained for reading or storing a last element through operations for all vector instructions preceding the post instruction, all the outputs of the AND circuits 38, 40, and 42 become inactive. The outputs of the AND circuits 38, 40, and 42 are supplied to the execution stage control circuit 200. The execution stage control circuit 200 outputs the SERIALIZING START signal to the memory control unit 14 when all the output of the AND circuits 38, 40, and 42 become inactive and the POST-PENDING1 signal is active. FIG. 6 shows a construction to generate the SERIALIZING START signal in the execution stage control circuit 200.

FIG. 7 shows a construction of the memory control unit 14 relating to the buffer invalidation. In FIG. 7, reference numerals 71, 72, 73, and 74 each denote a port circuit corresponding to one of a plurality of ports which respectively and independently receive one the requests from the scalar unit 1, the vector unit 2, the channel processors, and others, and outputs an acknowledge signal to the unit or the processor which sent the received request, using a priority control circuit (not shown) comprised therein. The above port circuits 71, 72, 73, and 74 each comprise a construction for transferring addresses which are to be used for the buffer invalidation, as shown in FIG. 6.

In each port circuit of FIG. 7, reference numeral 51 denotes a store address register, 52 denotes a selector, 53 denotes a first buffer invalidation register, 54 denotes a tag register, 55 denotes a tag storage, 56 denotes a match detecting circuit, 57 denotes a second buffer invalidation register, 58 denotes a match flag register, 59 denotes a buffer invalidation address storage, 60 denotes an input pointer, 61 denotes an output pointer, 62 denotes a subtraction circuit, and 63 denotes a number register When a block of data stored in the buffer memory 15 in the scalar unit 1 is renewed, the tag address of the new block is supplied to one of the input terminals of the selector 52, and is written in the tag storage 55 through the tag register 54. The address of the main storage to which a store operation is carried out, is temporarily held in the store address register 51, and then latched in the first buffer invalidation register 53 through the selector 52. The output of the first buffer invalidation register 53 is compared with all the content of the tag storage 55. When a match between the output of the first buffer invalidation register 53 and an tag address in the tag storage 55 is detected, "1" is output from the match circuit 56 and is latched in the match register 58. The output of the first buffer invalidation register 53 is then latched in the second buffer invalidation register 57, and the output of the match register 58 is supplied to the buffer invalidation address storage 59 as an input control signal to store the output of the second buffer invalidation register 57 in the buffer invalidation address storage 59. The input pointer 60 counts the number of inputs in the buffer invalidation address storage 59, and the output counter 61 counts the number of outputs in the buffer invalidation address storage 59. The subtraction circuit 62 subtracts the count of the output counter 61 from the count of the input counter 60. The output of the subtraction circuit 62 is latched in the number register 63 when the SERIALIZING START signal is supplied from the execution stage control circuit 200, and the content of the number register 63 is decremented when each of remaining addresses is output from the buffer invalidation address storage 59.

In FIG. 7, reference numeral 64 denotes a selector, 65 denotes a buffer invalidation address register, and 66 denotes a "0" detection circuit. The output of the buffer invalidation address storage 59 in the port circuit 71 for the port A is denoted by A', and similar outputs of buffer invalidation address storages in the port circuits 72, 73, and 74 for the ports B, C, and D are respectively denoted by B', C', and D'. These outputs A', B', C', and D' of the buffer invalidation address storages in the port circuits 71, 72, 73, and 74, are input in the selector 64, and are transferred to the scalar unit 1 through the selector 64 and the buffer invalidation address register 65. The output of the number register 63 in the port circuit 71 for the port A is denoted by A'', and similar outputs of number registers in the port circuits 72, 73, and 74 for the ports B, C, and D are respectively denoted by B'', C'', and D''. All the outputs A'', B'', C'', and D'' of the number registers are applied to the "0" detection circuit 66. The "0" detection circuit 66 determines whether or not all the outputs A'', B'', C'', and D'' are zero, and outputs the BI-PENDING signal which is "0" when all the outputs A'', B'', C'', and D'' are zero, i.e., all addresses stored in the buffer invalidation address storages in the port circuits 71, 72, 73, and 73 have been transferred to the execution stage control circuit 200. The "0" detection circuit 66 also outputs the SERIALIZING COMPLETE signal through the buffer invalidation address register 65 to the scalar unit 1.

Figure 8:
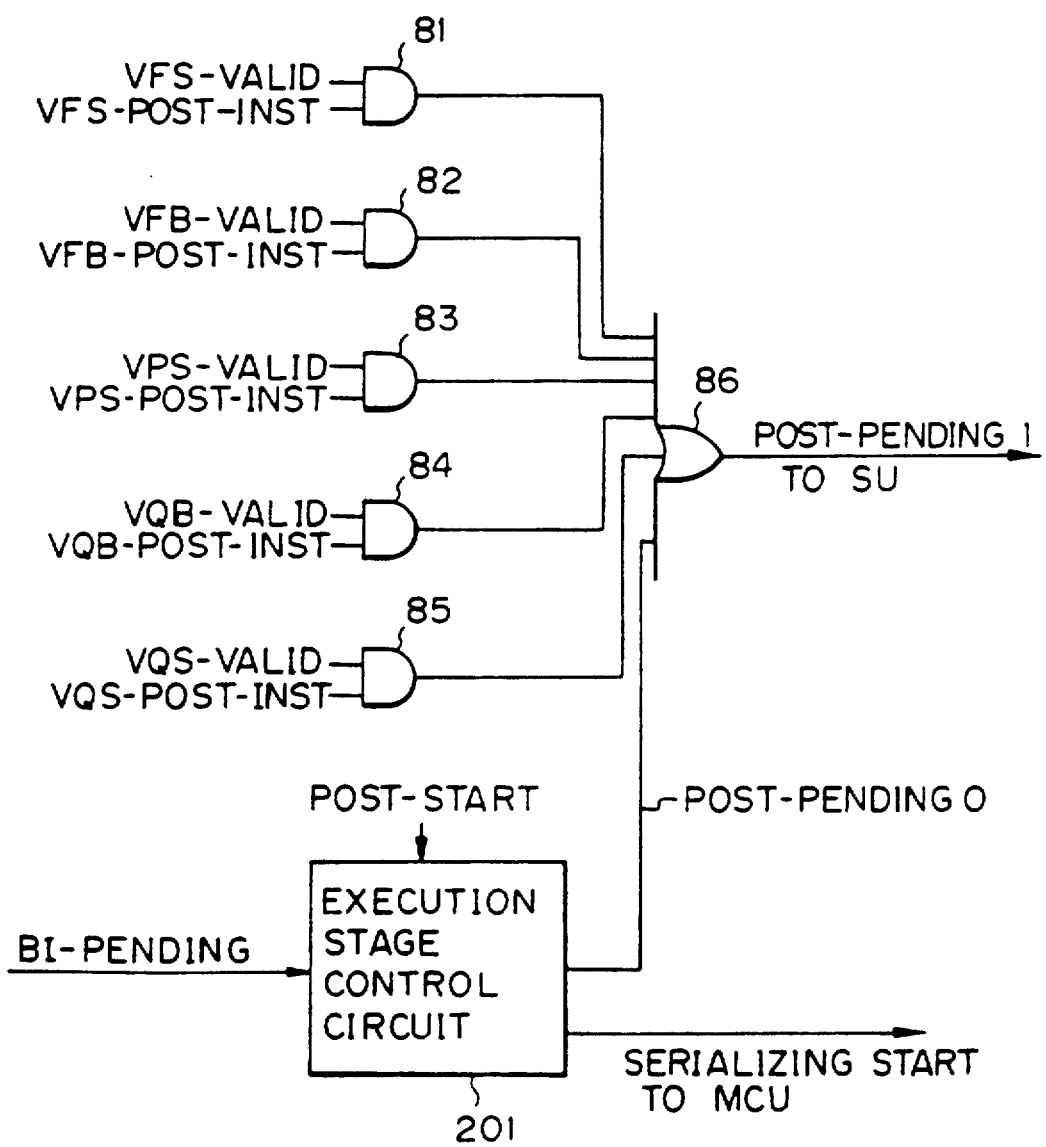
FIG. 8 shows a construction for generating the POST-PENDING1 signal in the execution stage control circuit 200.

FIG. 8 shows a construction for generating the POST-PENDING1 signal in the execution stage control circuit 200. In FIG. 8, reference numerals 81, 82, 83, 84, and 85 each denote an AND circuit, 86 denotes an OR circuit, and 201 denotes the other portion of the execution stage control circuit 200. VFS-VALID denotes of the valid bit of the vector instruction fetch stage register 31, VFB-VALID denotes the output of the valid bit of the vector instruction fetch stage buffer register 33, VPS-VALID denotes the output of the valid bit of the vector instruction decode stage register 34, VQB-VALID denotes the output of the valid bit of the vector instruction start stage buffer register 35, and VQS-VALID denotes the output of the valid bit of the vector instruction start stage register 36. VFS-POST-INST denotes the output of the post instruction bit of the vector instruction fetch stage register 31, VFB-POST-INST denotes the output of the post instruction bit of the vector instruction fetch stage buffer register 33, VPS-POST-INST denotes the output of the post instruction bit of the vector instruction decode stage register 34, VQB-POST-INST denotes the output of the post instruction bit of the vector instruction start stage buffer register 35, and VQS-POST-INST denotes the output of the post instruction bit of the vector instruction start stage register 36.

As shown in FIG. 8, the above VFS-VALID signal and the above VFS-POST-INST signal are input into the AND circuit 81, the above VFB-VALID signal and the above VFB-POST-INST signal are input into the AND circuit 82, the above VPS-VALID signal and the above VPS-POST-INST signal are input into the AND circuit 83, the above VQB VALID signal and the above VQB-POST-INST signal are input into the AND circuit 84, and the above VQS-VALID signal and the above VQS-POST-INST signal are input into the AND circuit 85. All the outputs of the AND circuits 81 to 85 and a POST-PENDING0 signal from the circuit 201 are input in the OR circuit 86. The POST-PENDING0 signal is generated in the circuit 201 as a logical sum of the BI-PENDING signal and all the outputs of the AND circuits 38, 40, and 42. The OR circuit 86 outputs the POST-PENDING1 signal which is supplied to the scalar unit 1. Namely, the POST-PENDING1 signal is active when a post instruction is held in any of the vector instruction fetch stage register 31, the vector instruction fetch stage buffer register 33, the vector instruction decode stage register 34, the vector instruction start stage buffer register 35, and the vector instruction start stage register 36, or when a right to access the storage has not been obtained for reading or storing a last element through operations for all vector instructions preceding the post instruction, or when an address stored in the buffer memory invalidation address storing circuit has not been transferred to the scalar unit yet.

In the following, constructions relating to the present invention in the scalar unit 1 are explained.

Figure 9:
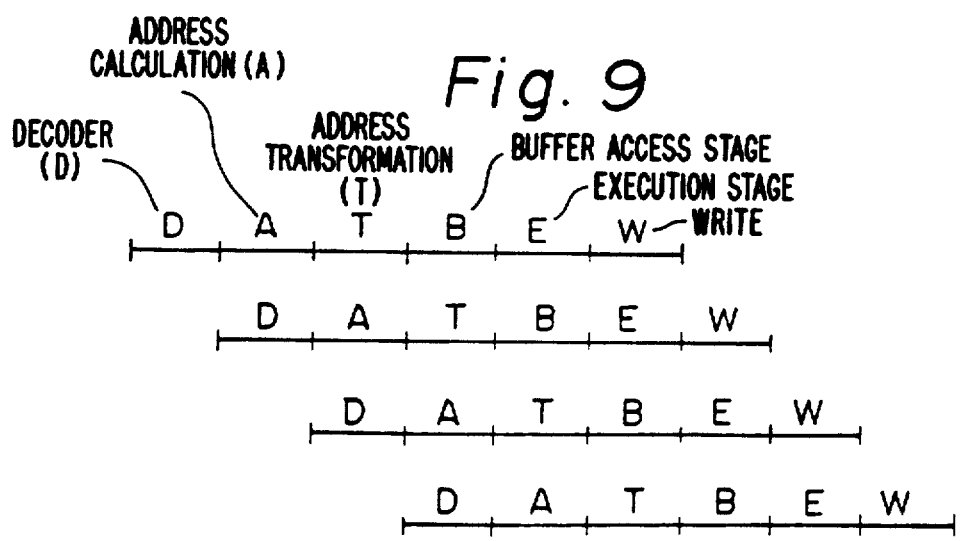
FIG. 9 shows an example of a plurality of processing flows which are processed in the scalar unit for a scalar instruction.

First, an example of processing flows for a scalar instruction in the scalar unit 1 in the embodiment of the present invention is explained with reference to FIG. 9. As shown in FIG. 9, a scalar instruction is processed in a plurality of processing flows by pipeline processing, and generally each flow comprises a decode stage D, an address calculation stage A, an address transformation stage T, a buffer access stage B, an execution stage E, and a write stage W for writing a result of the execution.

Figure 10:
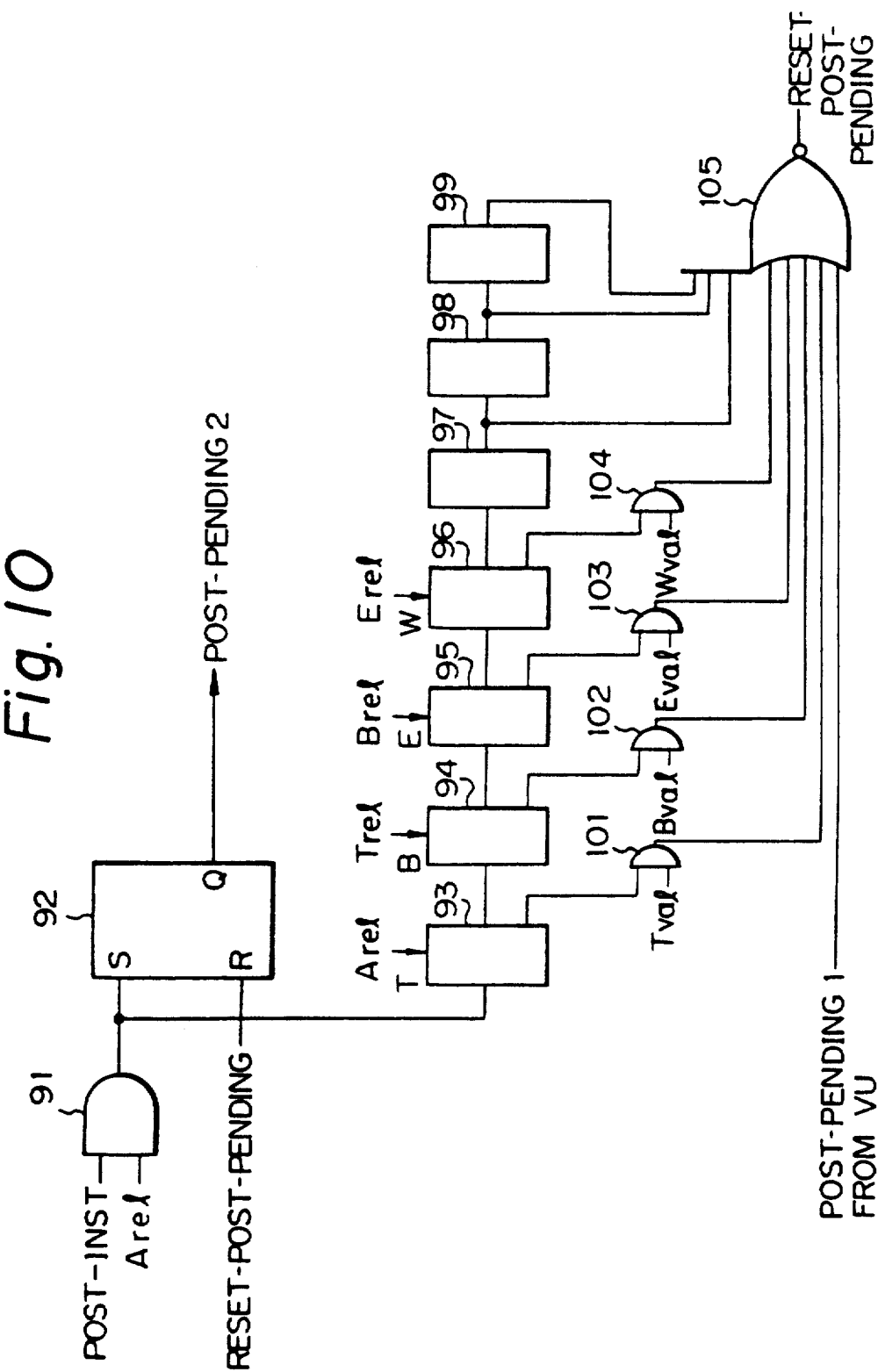
FIG. 10 shows a construction for generating a POST-PENDING2 signal in the scalar unit 1.

FIG. 10 shows a construction for generating a POST-PENDING2 signal in the scalar unit 1. In FIG. 10, reference numerals 91, 101, 102, 103, and 104 each denote an AND circuit, 92 denotes an RS-type flip-flop circuit, 93 to 99 each denote a register, and 105 denotes a NOR circuit. The POST-INST signal shown in FIG. 10 is generated by decoding an instruction which is newly fetched in the scalar unit 1, although the decoder is not shown. The WAIT-INST signal becomes active when a post instruction is detected in the decoder. The $A_{rel}$ signal is an A-stage release signal which is output from a control circuit (not shown) of the scalar unit 1, which controls the pipeline processing in the scalar unit 1, when an execution of a scalar instruction is released from the A-stage (the address calculation stage as mentioned before with reference to FIG. 9). Similarly, $T_{rel}$, $B_{rel}$, and $E_{rel}$ signals are respectively release signals from the T-stage, B-stage, and E-stage (FIG. 9), and $T_{val}$, $B_{val}$, $E_{val}$, and $W_{val}$ signals are respectively valid signals of the T-stage, B-stage, E. stage, and W-stage (FIG. 9).

In the construction of FIG. 10, the POST-INST signal and the $A_{rel}$ signal are input into the AND circuit 91, and the output of the AND circuit 91 is applied to the set input terminal S of the flip-flop circuit 92. When a post instruction is fetched in the scalar unit 1, the post instruction is detected by the above-mentioned decoder, and the POST-INST signal becomes active. When the post instruction is released from the address calculation stage A, the $A_{rel}$ signal becomes active, and thus the flip-flop circuit 92 is set to make its Q output active. The Q-output of the flip-flop circuit 92 is the above POST-PENDING2 signal. The output of the AND circuit 91 is also applied to the register 93, and is input into the register 93 synchronized with a clock when the above $A_{rel}$ signal is active. The output of the register 93 is applied to the register 94, and is input into the register 94 synchronized with the clock when the above $T_{rel}$ signal is active. The output of the register 94 is applied to the register 95, and is input into the register 95 synchronized with the clock when the above $B_{rel}$ signal is active. The output of the register 95 is applied to the register 96, and is input into the register 96 synchronized with the clock when the above $E_{rel}$ signal is active. Three further registers 97, 98, and 99 are provided following the above registers 93 to 96. The output of the registers 93, 94, 95, and 96 are respectively applied to input terminals of each of the AND circuits 101, 102, 103, and 104, and the above $T_{val}$, $B_{val}$, $E_{val}$, and $W_{val}$ signals are respectively applied to other input terminals of the AND circuits 101, 102, 103, and 104. The outputs of the AND circuits 101, 102, 103, and 104, the output of the registers 97 to 99, and the POST-PENDING1 signal from the vector unit 2, are input into the NOR circuit 105, and the output of the NOR circuit 105 is applied to the flip-flop circuit 92 as a reset signal RESET-POST-PENDING. The outputs of the AND circuits 101 to 104 respectively indicate whether or not a post instruction is processed in the respective stages of the pipeline in the scalar unit 1. As the post instruction is transferred to the vector unit 2 in the W-stage, according to the above construction, the POST-PENDING2 signal becomes active when a post instruction is released from the A-stage of the pipeline in the scalar unit 1, and is maintained until the POST-PENDING1 signal from the vector unit 2 becomes inactive. The above three registers 97 to 99 are provided for maintaining the activeness of the POST-PENDING2 signal after the post instruction is released from the W-stage of the scalar unit 1 until the POST-PENDING1 signal from the vector unit 2 becomes active responding to a reception of the post instruction by the vector unit 2.

Figure 11:
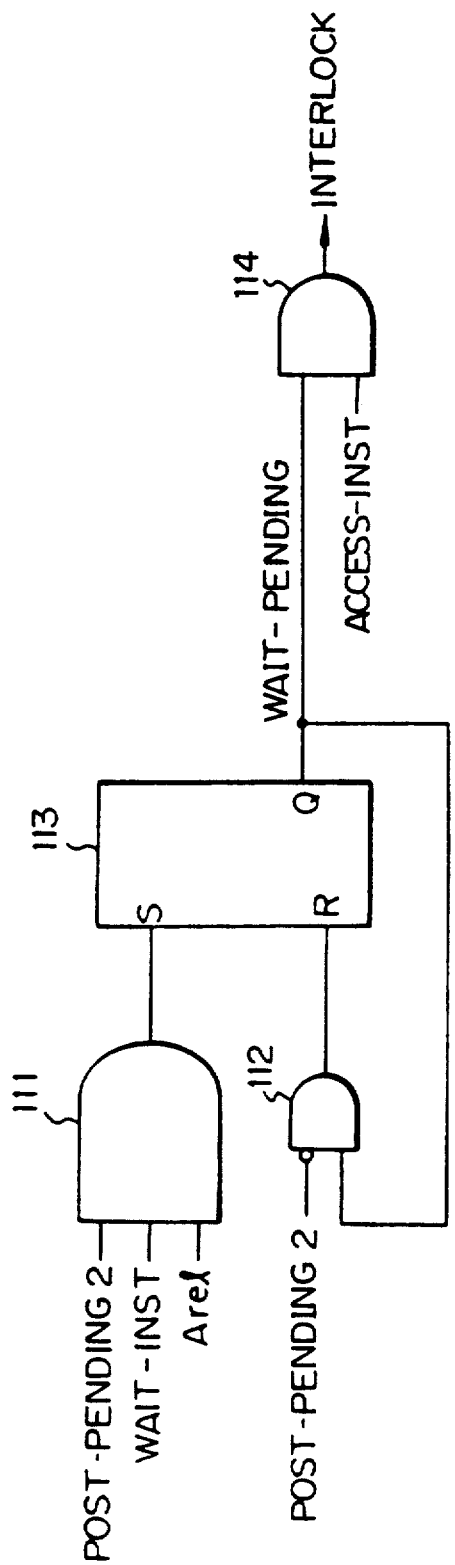
FIG. 11 shows a construction for generating an INTERLOCK in the scalar unit 1.

FIG. 11 shows a construction for generating an INTERLOCK signal in the scalar unit 1. In FIG. 11, reference numerals 111, 112, and 114 each denote an AND circuit, and 113 denotes an RS-type flip-flop circuit. The WAIT-INST signal and the ACCESS-INST signal shown in FIG. 11 are generated by decoding an instruction which is newly fetched in the scalar unit 1, although the decoder is not shown. The WAIT-INST signal becomes active when a wait instruction is detected in the decoder, and the ACCESS-INST signal becomes active when a scalar instruction whose operation includes an access operation to the main storage, is detected in the decoder. The $A_{rel}$ signal is the aforementioned A-stage release signal which is output when an execution of a scalar instruction is released from the A-stage.

The POST-PENDING2 signal, the WAIT-INST signal, and the $A_{rel}$ signal are input into the AND circuit 111, and the output of the AND circuit 111 is applied to the set input terminal S of the flip-flop circuit 113. The output of the AND circuit 111 is active when a wait instruction is released from the A-stage and the POST-PENDING2 signal is active. The Q-output of the flip-flop circuit 113 is denoted by a WAIT-PENDING, and is applied to one input terminal of each of the AND circuits 112 and 114. The inversion of the POST-PENDING2 signal is applied to the other input terminal of the AND circuit 112. The output of the AND circuit 112 is applied to the reset input terminal of the flip-flop circuit 113. The ACCESS INST signal is applied to the other input terminal of the AND circuit 114. The output of the AND circuit 114 is obtained as the INTERLOCK signal which is a control signal to suspend execution of scalar instructions which follow the wait instruction and whose operation includes an access operation to the main storage.

Thus, when a wait instruction is released from the A stage and the POST-PENDING2 signal is active, the flip-flop circuit 113 is set, i.e., the WAIT-PENDING signal becomes active. When the WAIT-PENDING signal becomes active, the INTERLOCK signal becomes active when a scalar instruction which follows the wait instruction and whose operation includes an access operation to the main storage, is detected. Therefore, the execution of the scalar instruction as above, is suspended. When the POST-PENDING2 signal becomes inactive while the WAIT-PENDING signal is active, the output of the AND circuit 112 becomes active, the flip-flop circuit 113 is reset, and the WAIT-PENDING signal becomes inactive, and thus, the above suspended execution of the scalar instruction is released.

Figure 12A:
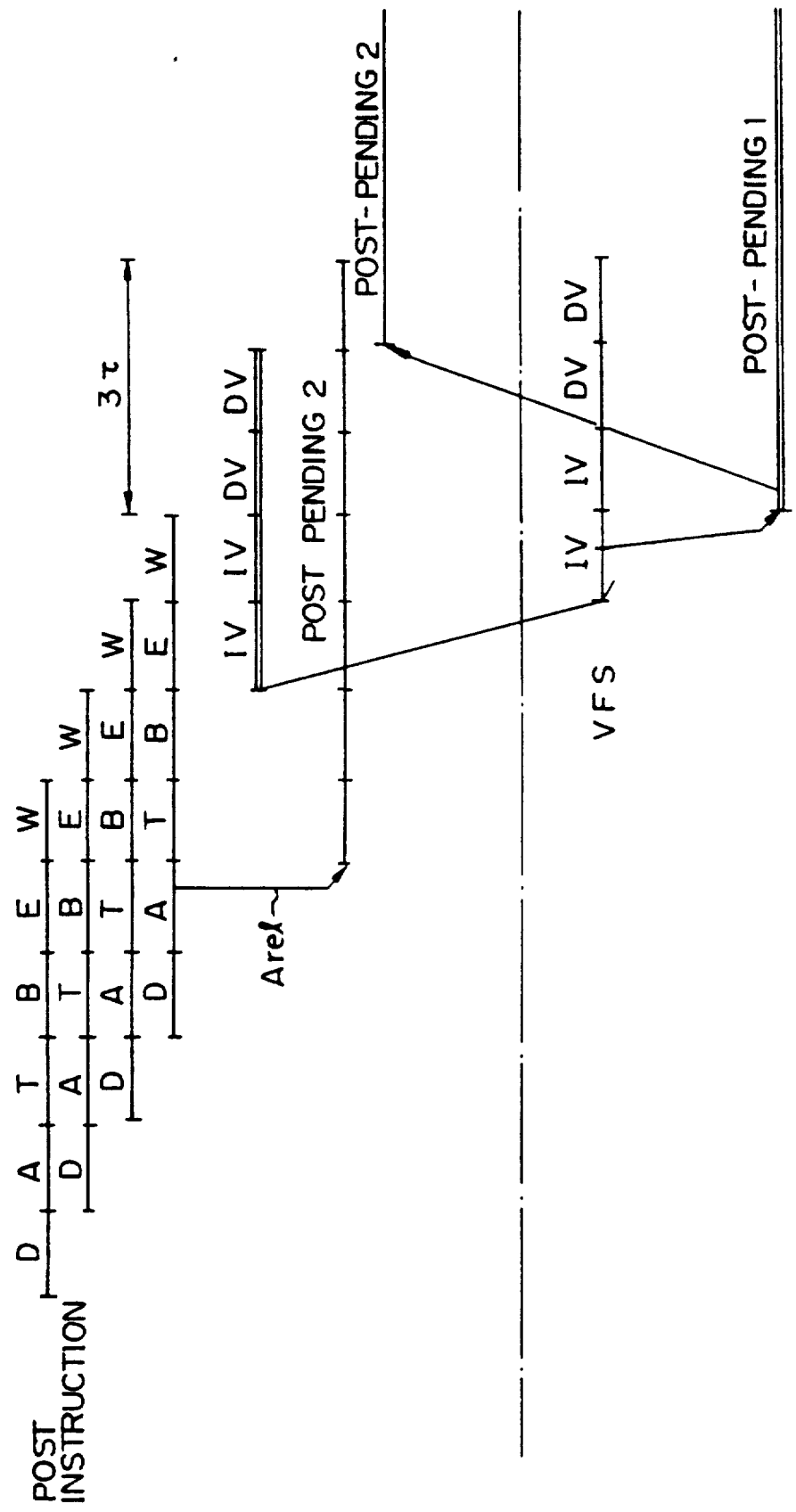
Figure 12B:
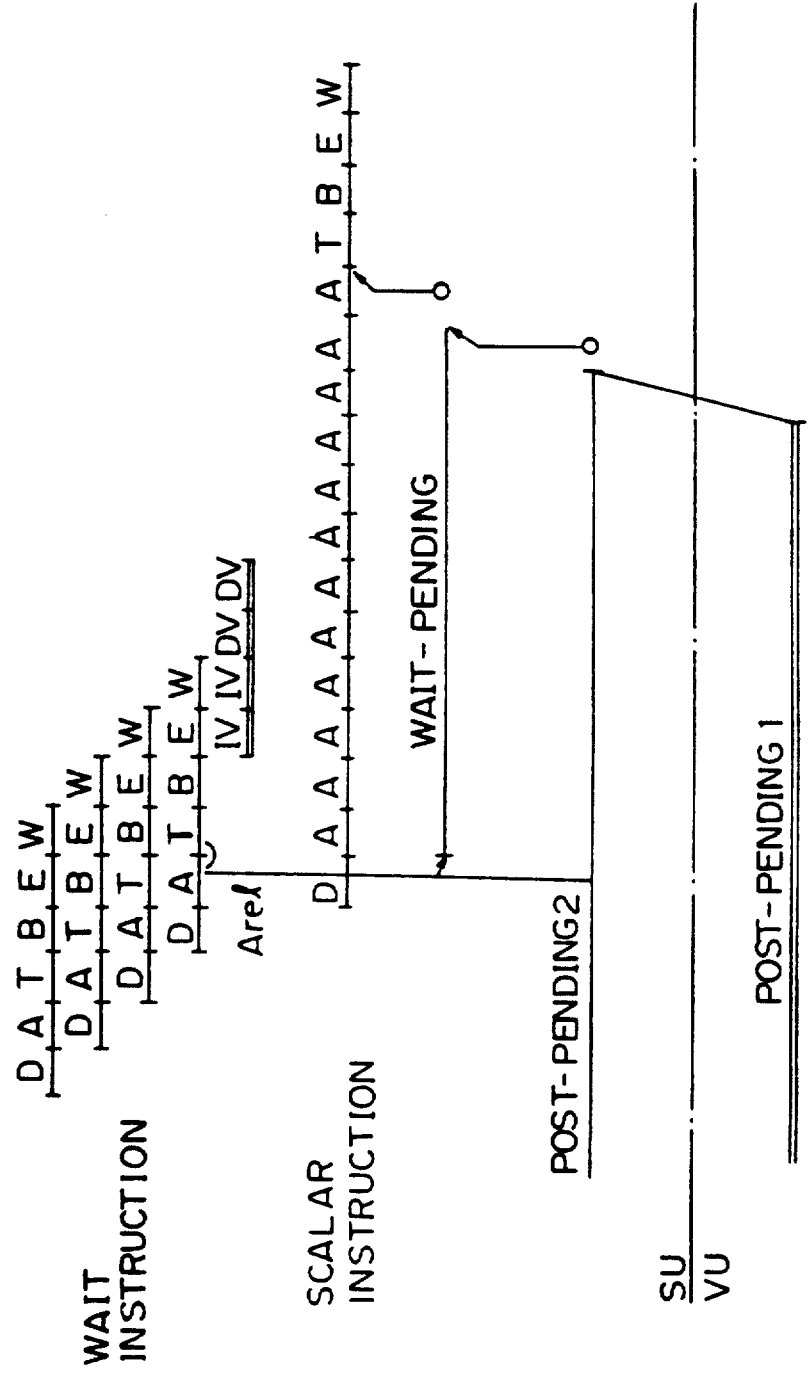

FIGS. 12A to 12C shows an example of the operations of the embodiment of the present invention.

In the example of FIGS. 12A to 12C, the operations in the scalar unit 1 are shown in the upper half area SU of FIGS. 12A to 12C, the operations in the vector unit 2 are shown in the lower half area VU of FIGS. 12A to 12C, the operations a post instruction and a wait instruction are respectively executed in four flows of operations through a pipeline in the scalar unit 1, as explained before with reference to FIG. 9, and active signals and valid stages of the operations are respectively indicated by solid lines.

when an $A_{rel}$ signal for a post instruction is output from the aforementioned control circuit, the POST-PENDING2 signal becomes active, and the activeness of the POST-PENDING2 signal is maintained by itself until three cycles (3t) elapse after the W-stage operation for the post instruction is completed in the scalar unit 1. The instruction data of the post instruction is transferred to the vector unit 2 in four cycles which are denoted by IV and DV. Responding to the first cycle of the transfer IV, the vector unit 2 detects the reception of the post instruction, the POST-PENDING1 signal becomes active, and the active POST-PENDING1 signal maintains the above activeness of the POST-PENDING2 signal in the scalar unit 1.

In FIG. 12B, since the POST-PENDING2 signal is active following the operations of FIG. 12A, when a wait instruction is detected and the wait instruction is re leased from the A-stage, the WAIT-PENDING signal becomes active, and therefore, the execution of the scalar instruction following the wait instruction is suspended at its A-stage. Then, when the POST-PENDING1 signal becomes inactive, the WAIT-PENDING signal becomes inactive, i.e., the INTERLOCK signal becomes inactive, and the the execution of the above scalar instruction is released.

FIG. 12C shows an operation when the POST-PENDING2 signal is inactive when a wait instruction is released from the A-stage. In this case, the WAIT- PENDING signal is inactive, i.e., the INTERLOCK signal is inactive, and therefore, the execution of the scalar instruction following the wait instruction is immediately started.

What is claimed is:

1. A data processing system comprising:
   a storage for storing data and instructions including scalar instructions, vector instructions, a post instruction and a wait instruction;
   a scalar unit, connected to said storage, fetching the instructions from the storage, processing the scalar instructions included in the instructions, and transferring the vector instructions, the post instruction, and the wait instruction included in the instructions to a vector unit;
   said vector unit, connected to the scalar unit, receiving the vector instructions, the post instruction, and the wait instruction from the scalar unit, executing said vector instructions, the post instruction, and the wait instruction received from the scalar unit, and comprising
   first post pending signal generating means for generating and outputting to the scalar unit a first post pending signal which is made active when the post instruction is received in the vector unit, and is made inactive when a last access to the storage in execution of all the vector instructions preceding the post instruction is commenced; and said scalar unit comprising:
   post instruction detecting means for detecting a receipt of the post instruction in said scalar unit, and outputting a first detected result of the receipt of the post instruction;
   wait instruction detecting means for detecting a receipt of a wait instruction in said scalar unit, and outputting a second detected result of the receipt of the wait instruction;
   second post pending signal generating means which receives the first detected result from said post instruction detecting means and said first post pending signal from the first post pending signal generating means, and generates a second post pending signal which is made active when the post instruction is detected by the post instruction detecting means, and is made inactive when said first post pending signal becomes inactive; and
   interlock control means for receiving the second detected result from the wait instruction detecting means and the second post pending signal from the second post pending signal generating means and suspending execution of the scalar instructions following the receipt of the wait instruction detected by said wait instruction detecting means until the second post pending signal changes from active to inactive, each of the scalar instructions including an operation to access said storage.

2. A data processing system according to claim 1, wherein
   said first post pending signal generating means in said vector unit comprises:
   flag means which are provided corresponding to stages including a vector instruction fetch stage through a vector instruction start stage for the vector instructions, respectively having outputs indicating that the post instruction is currently processed int he stages;
   after-start stages control means for controlling execution of a vector instruction after a start of the execution, and comprising last memory access detecting means for detecting that a last access to said storage in the execution of all the vector instructions preceding the post instruction is commenced, and outputting a last memory access signal which indicates the detecting, said last memory access signal being active when said execution is commenced; and
   first gate means which receives all the outputs of said flag means and said last memory access signal from said after-start stages control means, and outputs said first post pending signal which is made active when either of the outputs of said flag means is active and the last memory access signal is inactive, and is made inactive when neither of the outputs of said flag means is active and the last memory access signal is active.

3. A data processing system according to claim 2, wherein said second post pending signal generating means comprises:
   a status register receiving a status input which becomes active when execution of the post instruction is released from an address calculation stage in the scalar unit, being set when the status input becomes active, being reset by receiving a reset signal, and outputting said second post pending signal which is active only when the status register is set,
   a shift register, connected to said status register, comprising a plurality of registers provided corresponding to a plurality of operation stages in execution of the post instruction processed in said scalar unit, and at least one additional register connected to one of the plurality of registers, the status input being latched in an output from respective registers corresponding to current operation stages in the execution of the post instruction, the at least one additional register receiving the holding an output of the one of the plurality of registers corresponding to a final stage of the plurality of operation stages until the first post pending signal generated by the first post pending signal generating means becomes active responding to the post instruction after the status input becomes active, and
   second gate means which receives as inputs all outputs of said plurality of registers and the at least one additional register in said shift register and said first post pending signal from said vector unit, and generates and outputs to said status register said reset signal, where said reset signal is made active when neither of the inputs of the second gate means is active.

4. A data processing system, comprising:
   a storage for storing data and instructions including scalar instructions, vector instructions, a post instruction, and a wait instruction;
   a scalar unit, connected to said storage, fetching the instructions from the storage, processing the scalar instructions included in the instructions, and transferring the vector instructions, the post instruction, and the wait instruction included in the instructions to a vector unit;
   said vector unit, connected to the scalar unit, receiving the vector instructions, the post instruction, and the wait instruction from the scalar unit, executing said vector instructions, the post instruction, and the wait instruction received from the scalar unit, and comprising:

first post pending signal generating means for receiving a memory access acknowledge signal from a memory control unit, and generating and outputting to the scalar unit a first post pending signal which is made active when the post instruction is received in the vector unit, and is made inactive when the memory access acknowledge signal is received from the memory control unit for a last access to the storage in execution of all the vector instructions preceding the post instruction; and said scalar unit comprising:

post instruction detecting means for detecting a receipt of the post instruction in said scalar unit, and outputting a first detected result of the receipt of the post instruction, wait instruction detecting means for detecting a receipt of a wait instruction in said scalar unit, and outputting a second detected result of the receipt of the wait instruction, second post pending signal generating means which receives the first detected result output from said post instruction detecting means and said first post pending signal from the first post pending signal generating means, and generates a second post pending signal which is made active when the post instruction is detected in the scalar unit and is made inactive when said first post pending signal becomes inactive, and interlock control means for suspending execution of the scalar instructions following the receipt of the wait instruction detected by said wait instruction detecting means until said second post pending signal changes from active to inactive each of the scalar instructions including an operation to access said storage and said memory control unit, connected to said vector unit and said scalar unit, and comprising receiving means for receiving requests for accessing the storage from said scalar unit and said vector unit, and priority control means for outputting an active memory access acknowledge signal responding to one of the requests received from said receiving means allowing an access to the storage to one of the scalar unit and the vector unit in response to the one of the requests.

5. A data processing system according to claim 4, wherein
the first post pending signal generating means in said vector unit comprises:

flag means which are provided corresponding to stages from a vector instruction fetch stage to a vector instruction start stage for the vector instructions, respectively having outputs indicating that the post instruction is currently processed in the stages, after-start stages control means for controlling execution of a vector instruction after a start of the execution, and comprising last memory access acknowledge signal is received from the memory control unit for a last access to said storage in the execution of all the vector instructions preceding the post instruction, and outputting a last memory access signal which indicates the detecting, and first gate means which receives all the outputs of said flag means and said last memory access signal from said after-start stages control means, and outputs the first post pending signal which is made active when either of the outputs of said flag means is active and the last memory access signal is inactive, and is made inactive when neither of the outputs of said flag means is active and the last memory access signal is active.

6. A data processing system according to claim 5, wherein said second post pending signal generating means comprises:

a status register receiving a status input which becomes active when execution of the post instruction is released from an address calculation stage in the scalar unit, being set when the status input becomes active, being reset by receiving a reset signal, and outputting said second post pending signal which is active only when the status register is set, a shift register, connected to said status register, comprising a plurality of registers provided corresponding to a plurality of operation stages in execution of the post instruction processed in said scalar unit, and at least one additional register connected to one of the plurality of registers, the status input being latched in and output from respective registers corresponding to current operation stages in the execution of the post instruction, the at least one additional register receiving and holding an output of the one of the plurality of registers corresponding to a final stage of the plurality of operation stages until the first post pending signal generated by the first post pending signal generating means becomes active responding to the post instruction after the status input becomes active, and second gate means which receives as inputs all outputs of said plurality of registers and the at least one additional register in said shift register and said second post pending signal from said vector unit, and generates and outputs to said status register said reset signal, where said reset signal is made active when neither of the inputs of the second gate means is active.

7. A data processing system, comprising:
a storage for storing data and instruction including scalar instructions, vector instructions, a post instruction, and a wait instruction;
a scalar unit, connected to said storage, fetching the instructions from the storage, processing the scalar instructions included in the instructions, and transferring the vector instructions, the post instruction, and the wait instruction included in the instructions to a vector unit;
said vector unit, connected to the scalar unit, receiving the vector instructions, the post instruction, and the wait instruction from the scalar unit, executing the vector instructions, the post instruction, and the wait instruction received from the scalar unit, outputting requests for accessing said storage when executing the vector instructions, and comprising:
after-start stages control means for controlling execution of a vector instruction after a start of the execution, and comprising last memory access detecting means for detecting that a memory access acknowledge signal is received from a memory control unit for a last access to said storage in the execution of all the vector instructions preceding the post instruction, and outputting a last memory access signal which indicates the detecting, and first post pending signal generating means for generating and outputting to the scalar unit a first post pending signal which is made active when the post instruction is received from the scalar unit, and is made inactive when a transfer complete signal is received from and generated by transfer complete signal generating means and a last memory access signal is received from said last memory access detecting means; said scalar unit comprising:

a buffer memory for temporarily storing a portion of data stored in said storage, buffer memory invalidation means for invalidating a portion of data stored in said buffer memory when the portion of data corresponds to an address which is transferred by buffer memory invalidation address transferring means, post instruction detecting means for detecting a receipt of the post instruction in said scalar unit, and outputting a first detected result of the receipt of the post instruction, wait instruction detecting means for detecting a receipt of a wait instruction in said scalar unit, and outputting a second detected result of the receipt of the wait instruction, second post pending signal generating means which receives the first detected result output from said post instruction detecting means and said first post pending signal from the first post pending signal generating means, and generates a second post pending signal which is made active when the post instruction is detected in the scalar unit and is made inactive when said first post pending signal becomes inactive, and interlock control means for suspending execution of the scalar instructions following the receipt of the wait instruction detected by said wait instruction detecting means until said second post pending signal changes from active to inactive each of the scalar instructions including an operation to access aid storage; and said memory control unit, connected to said vector unit and said scalar unit, and comprising:

receiving means for receiving requests for accessing the storage from said scalar unit and said vector unit, buffer memory invalidation address storing means for temporarily storing addresses which address said storage access operations carried out by the vector unit, said buffer memory invalidation address transferring means for transferring said addresses stored in said buffer memory invalidation address storing means to said scalar unit, and for removing the addresses from the buffer memory invalidation address storing means, said transfer complete signal generating means for generating the transfer complete signal which indicates that all the addresses stored in said buffer memory invalidation address storing means have been transferred to said scalar unit when active, and priority control means for outputting a memory access acknowledge signal responding to one of the requests for supplying an allowance to access the storage to one of the scalar unit and the vector unit in response to the one of the requests.

8. A data processing system according to claim 7, wherein the first post pending signal generating means in said vector unit comprises:

flag means which are provided corresponding to a plurality of operation stages for instructions processed in said vector unit, respectively having outputs indicating that he post instruction is processed in the stages, and first gate means which receives all the outputs of said flag means, said transfer complete signal from said memory control unit, and said last memory access signal from said last memory access detecting means, and outputs said first post pending signal which is made active when either of the outputs of said flag means is active and one of the transfer complete signal and the last memory access signal is inactive, and is made inactive when neither of the outputs of said flag means is active and both the transfer complete signal and the last memory access signal are active.

9. A data processing signal according to claim 8, wherein said second post pending signal generating means in said vector unit comprises:

a status register receiving a status input which becomes active when execution of the post instruction is released from an address calculation stage in the scalar unit, being set when the status input becomes active, being reset by receiving a reset signal, and outputting said second post pending signal which is active only when the status register is set, a shift register, connected to said status register, comprising a plurality of registers provided corresponding to a plurality of operation stages in execution of the post instruction processed in said scalar unit, and at least one additional register connected to one of the plurality of registers, the status input being latched in and output from respective registers corresponding to current operation stages in the execution of the post instruction, the at least one additional register receiving and holding an output of the one of the plurality of registers corresponding to a final stage of the plurality of operation stages until the first post pending signal generated by the first post pending signal generating means becomes active responding to the post instruction after the status input becomes active, and second gate means which receives as inputs all outputs of said plurality of registers in said shift register and said first post pending signal from said vector unit, and generates and outputs to said status register sand reset signal, where said reset signal is made active when neither of the inputs of the second gate means is active.

10. A data processing system according to claim 7, wherein said memory control unit further comprises:
an address table for storing table addresses of data which are currently stored in said buffer memory, and comparing means for comparing the addresses stored in said buffer memory invalidation address storing means with the table addresses stored in said address table, and said buffer memory invalidation address transferring means transfers an address stored in said buffer memory invalidation address storing means to said scalar unit, when the address stored in said buffer memory invalidation address storing means coincides with a table address stored in said address table.

* * * * *

UNITED STATES PATENT AND TRADEMARK OFFICE
CERTIFICATE OF CORRECTION

PATENT NO. : 5,247,691
DATED : September 21, 1993
INVENTOR(S) : SAKAI

It is certified that error appears in the above-indentified patent and that said Letters Patent is hereby corrected as shown below:

COVER PAGE: [7] ABSTRACT, line 10, change "Post Pending" to --post pending--.

Col. 9, line 66, delete "which addresses in".

Col. 12, line 30, after "receive one" insert --of--.

Col. 17, line 66, change "int he" to --in the--.

Col. 19, line 59, change "ac-" to --detecting means for detecting that the memory access--.

Col. 20, line 42, change "instruction" to --instructions--.

Col. 22, line 4, change "he" to --the--;
line 18, change "signal" to --system--;
line 49, change "sand" to --said--.

Signed and Sealed this

Eleventh Day of October, 1994

Attest:

BRUCE LEHMAN

Attesting Officer

Commissioner of Patents and Trademarks